United States Patent [19]
Li

[11] Patent Number: 6,094,287
[45] Date of Patent: Jul. 25, 2000

[54] WOBBLE CORRECTING MONOGON SCANNER FOR A LASER IMAGING SYSTEM

[75] Inventor: Peter Y. Li, Woodbury, Minn.

[73] Assignee: Eastman Kodak Company, Rochester, N.Y.

[21] Appl. No.: 09/205,547

[22] Filed: Dec. 3, 1998

[51] Int. Cl.⁷ .................................................. G02B 26/08
[52] U.S. Cl. .......................... 359/211; 359/216; 359/219; 359/226; 359/834; 358/491
[58] Field of Search .................................... 359/201, 211, 359/212, 216, 217, 218, 219, 220, 226, 834; 358/491, 493, 497

[56] References Cited

U.S. PATENT DOCUMENTS

| | | | |
|---|---|---|---|
| 3,584,369 | 6/1971 | De Montebello | 29/458 |
| 3,725,574 | 4/1973 | Gast | 178/6.7 R |
| 3,750,189 | 7/1973 | Fleischer | 346/74 ES |
| 3,871,803 | 3/1975 | Beattie | 425/175 |
| 3,903,218 | 9/1975 | Humphrey | 264/1 |
| 3,917,766 | 11/1975 | Howden | 264/1 |
| 3,946,150 | 3/1976 | Grafton | 178/6.7 R |
| 4,040,096 | 8/1977 | Starkweather | 358/302 |
| 4,383,755 | 5/1983 | Fedder et al. | 355/11 |
| 4,432,832 | 2/1984 | Fantone | 156/630 |
| 4,475,787 | 10/1984 | Starkweather | 350/6.4 |
| 4,496,209 | 1/1985 | Itoh et al. | 350/6.8 |
| 4,545,366 | 10/1985 | O'Neill | 126/440 |
| 4,606,601 | 8/1986 | Starkweather | 350/6.4 |
| 4,620,768 | 11/1986 | Tatsuno | 350/6.8 |

(List continued on next page.)

FOREIGN PATENT DOCUMENTS

| | | |
|---|---|---|
| 0 216 562 | 4/1987 | European Pat. Off. . |
| 0 357 396 | 3/1990 | European Pat. Off. . |
| 0 366 039 | 5/1990 | European Pat. Off. . |
| 0 367 241 | 5/1990 | European Pat. Off. . |
| 0 476 698 | 3/1992 | European Pat. Off. . |
| 0 740 454 | 10/1996 | European Pat. Off. . |
| 0 766 116 | 4/1997 | European Pat. Off. . |
| 56106203 | 8/1981 | Japan . |
| 03233423 | 10/1991 | Japan . |
| 8-136849 | 5/1996 | Japan . |
| 09033834 | 2/1997 | Japan . |
| 09159951 | 6/1997 | Japan . |
| 2 207 773 | 2/1989 | United Kingdom . |
| 2 307 305 | 5/1997 | United Kingdom . |

OTHER PUBLICATIONS

Beiser, Leo, "Optical Scanners", VHC Publishers, Inc., *Encyclopedia of Applied Physics*, vol. 12, pp. 337–368 (1995).

Beiser, Leo, "Design Equations for a Polygon Laser Scanner", Proceedings; SPIE—The International Society for Optical Engineering, *Beam Deflection and Scanning Technologies*, vol. 1454, pp. 60–66 (Feb. 25–Mar. 1, 1991).

Beiser, Leo, "Resolution of Laser Scanners", SPIE–The International Society for Optical Engineering, *Optical Engineering*, vol. 23, pp. 266–268 (May/Jun. 1984).

*Primary Examiner*—Cassandra Spyrou
*Assistant Examiner*—Leo Boutsikaris
*Attorney, Agent, or Firm*—William F. Noval

[57] ABSTRACT

Disclosed is an optical scanner assembly for producing an image on imaging material positioned on an internal surface of a curved film platen. The scanner assembly includes a light source for producing a light beam representative of the image to be produced on the imaging material, a reflective system rotatable about a rotation axis, and a toric lens. The reflective system comprises a scan optic defined by a pentaprism and a cylindrical lens. A first reflective surface of the pentaprism receives the light beam from the light source and reflects the light beam to a second reflective surface of the pentaprism. The light beam is further reflected by the second reflective surface towards the imaging material through the cylindrical lens and the toric lens, which act to focus the light beam onto the imaging material to produce the image thereon. The cylindrical and toric lenses in conjunction with the pentaprism correct for wobble along the rotation axis of the reflective system caused by bearing and mechanical inaccuracies in a drive mechanism of the reflective system.

28 Claims, 5 Drawing Sheets

U.S. PATENT DOCUMENTS

| | | | |
|---|---|---|---|
| 4,625,315 | 11/1986 | Lemberger et al. | 372/38 |
| 4,750,045 | 6/1988 | Ohara et al. | 358/285 |
| 4,853,709 | 8/1989 | Stein | 346/108 |
| 4,859,041 | 8/1989 | Suda | 350/423 |
| 4,936,643 | 6/1990 | Beiser | 350/6.5 |
| 4,945,287 | 7/1990 | Lawson | 250/236 |
| 4,971,544 | 11/1990 | Schneeberger | 425/528 |
| 4,999,142 | 3/1991 | Fukushima et al. | 264/1.7 |
| 5,026,133 | 6/1991 | Roddy | 350/6.4 |
| 5,029,956 | 7/1991 | Takanashi et al. | 350/6.8 |
| 5,033,806 | 7/1991 | Tomita et al. | 350/6.7 |
| 5,063,292 | 11/1991 | Brueggemann | 250/236 |
| 5,099,342 | 3/1992 | Ziegler | 358/487 |
| 5,114,217 | 5/1992 | Beiser | 359/216 |
| 5,124,089 | 6/1992 | Ohkoshi et al. | 264/1.4 |
| 5,183,597 | 2/1993 | Lu | 264/1.4 |
| 5,196,957 | 3/1993 | Brueggemann | 359/206 |
| 5,204,775 | 4/1993 | McDevitt | 359/442 |
| 5,208,701 | 5/1993 | Maeda | 359/574 |
| 5,227,910 | 7/1993 | Khattak | 359/211 |
| 5,235,467 | 8/1993 | Nagamachi | 359/742 |
| 5,247,383 | 9/1993 | Brueggemann | 359/197 |
| 5,292,457 | 3/1994 | Arai et al. | 264/1.7 |
| 5,455,708 | 10/1995 | Harris et al. | 359/226 |
| 5,486,694 | 1/1996 | Harris | 250/236 |
| 5,498,869 | 3/1996 | Appel et al. | 250/236 |
| 5,517,330 | 5/1996 | Maeda | 358/481 |
| 5,530,549 | 6/1996 | Nakamura et al. | 359/216 |
| 5,534,101 | 7/1996 | Keyworth et al. | 156/244.12 |
| 5,554,432 | 9/1996 | Sandor et al. | 428/157 |
| 5,566,016 | 10/1996 | Lee | 359/206 |
| 5,583,702 | 12/1996 | Cintra | 359/743 |
| 5,592,324 | 1/1997 | Inagaki et al. | 359/210 |
| 5,596,190 | 1/1997 | Li et al. | 250/236 |
| 5,610,751 | 3/1997 | Sweeney et al. | 359/197 |

WOBBLE CORRECTING MONOGON SCANNER FOR A LASER IMAGING SYSTEM

TECHNICAL FIELD

This invention relates to internal drum scanner assemblies and laser imaging systems incorporating such scanner assemblies. In particular, the present invention is a monogon optical scanner assembly having a rotatable scan optic and a pair of lenses that correct the effect of wobble, caused by bearing and mechanical inaccuracies in the scan optic drive mechanism, that would otherwise adversely affect the quality of the resulting film image produced by the laser imaging system.

BACKGROUND OF THE INVENTION

Laser imaging systems are commonly used to produce photographic images from digital image data generated by magnetic resonance (MR), computed tomography (CT) or other types of scanners. Systems of this type typically include a continuous tone laser imager for exposing the image on photosensitive film, a film processor for developing the film, and an image management subsystem for coordinating the operation of the laser imager and the film processor.

The digital image data is a sequence of digital image values representative of the scanned image. Image processing electronics within the image management subsystem processes the image data values to generate a sequence of digital laser drive values (i.e., exposure values), which are input to a laser scanner. The laser scanner is responsive to the digital laser drive values for scanning across the photosensitive film in a raster pattern for exposing the image on the film.

The continuous-tone images used in the medical imaging field have very stringent image-quality requirements. A laser imager printing onto transparency film exposes an image in a raster format, the line spacing of which must be controlled to better than one micrometer. In addition, the image must be uniformly exposed such that the observer cannot notice any artifacts. In the case of medical imaging, the observers are professional image analysts (e.g., radiologists).

Film exposure systems are used to provide exposure of the image on photosensitive film. Known film exposure systems include a linear translation system and a laser optical scanning assembly. The laser scanning assembly includes a laser scanner with unique optical configurations (i.e., lenses and mirrors), for exposure of the image onto the film. The linear translation system is a mechanical device that converts rotary motion into linear motion. The linear translation system provides for movement of the laser scanning assembly in a direction perpendicular to the scanning direction, such that a full image may be scanned onto a piece of photosensitive film.

In an internal drum type laser scanner assembly, a piece of film is positioned onto a film platen, wherein the film platen has a partial cylindrical or partial drum shape. The photosensitive film is positioned against the film platen. The laser optical scanning assembly is positioned at the center of curvature of the photosensitive film for scanning a scan line across the photosensitive film surface. The linear translation system moves the laser optical scanning assembly lengthwise along a longitudinal axis as defined by the center of curvature of the film to expose an entire two-dimensional image onto the film, consisting of a series of small dots known as pixels.

Typically, the laser optical scanning assembly includes a rotatable scan optic that consists of a single mirror, an assembly of more than one mirror, or a glass prism. The rotatable scan optic is commonly mounted on a shaft that is supported by some type of bearing assembly which includes radial and thrust bearings. The shaft itself is ultimately rotated by a motor which is driven by a controlling electronics system.

A drawback of this type of scanning assembly is that any inaccuracies in the fabrication of the bearings, shaft and/or motor result in "wobble" along the rotational axis of the rotatable scan optic. This mechanically induced wobble translates into a beam wobble causing laser beam pointing errors in a cross scan direction. These laser beam pointing errors ultimately result in image defects in the exposed image that adversely affect the quality of the resulting developed film image. Therefore, to achieve high quality, exacting images requires that the bearings, shaft and motor be fabricated from high quality materials using extremely precise manufacturing techniques. This translates into undesired high production costs for fabricating scanner assemblies for laser imaging systems.

Even though high quality materials and extremely precise manufacturing techniques can produce scanner assemblies that minimize wobble and generate high quality developed images, the components of these scanner assemblies still exhibit normal wear over time. For example, in order to obtain a high resolution image on the photosensitive film in as short a time as possible, it becomes necessary to rotate the rotatable scan optic at a very high rotational rate of speed. This speed is typically on the order of twenty thousand revolutions per minute (i.e., 20,000 rpms). This high rotational rate of speed can cause wear to the bearings, shaft and/or motor of a scanner assembly that can produce wobble causing image defects in the exposed image that adversely affect the quality of the resulting developed film image.

There is a need for an improved scanner assembly for use in a laser imaging system. In particular, there is a need for a scanner assembly that corrects for wobble along the rotational axis of the scan optic, so as to substantially eliminate image defects in the exposed image that would otherwise adversely affect the image quality of the developed photosensitive film. In addition, the scanner assembly should provide these features while being relatively easy to manufacture using lower cost scanner assembly components.

SUMMARY OF THE INVENTION

The present invention is an optical scanner assembly for producing an image on imaging material positioned on an internal surface of a curved film platen. The scanner assembly includes a light source for producing a light beam representative of the image to be produced on the imaging material. The light beam exits the light source along a beam axis. The scanner assembly also includes a reflective system rotatable about a rotation axis substantially coincident with the beam axis. The reflective system includes a scan optic and a first lens device. The scan optic is defined by first and second reflective surfaces. The first reflective surface receives the light beam from the light source and reflects the light beam. The second reflective surface receives the light beam reflected from the first reflective surface, and reflects the light beam toward the imaging material on the internal surface of the curved film platen. The first lens device of the reflective system receives the light beam reflected from the second reflective surface and focuses the light beam.

The scanner assembly also includes a second lens device that is stationary with respect to the rotatable reflective system. The second lens device receives the light beam focused by the first lens device and further focuses the light beam onto the imaging material to produce the image thereon. In practice, the first lens device focuses the light beam in a first plane, while the second lens device focuses the light beam in a second plane that is perpendicular to the first plane. The first and second lens devices are defined by a cylindrical lens and a toric lens, respectively. The scan optic of the rotatable reflective system is a pentaprism wherein the first and second reflective surfaces are defined by first and second internal reflective surfaces of the pentaprism. The first lens device is on an exiting surface of the pentaprism.

By using first and second lens devices in conjunction with the scan optic, and by placing the first lens device on the exiting surface of the pentaprism, this scanner assembly corrects for wobble along the rotation axis of the scan optic of the reflective system caused by bearing and mechanical inaccuracies in a drive mechanism of the scan optic. By correcting for wobble, the scanner assembly substantially eliminates image defects in the image produced on the imaging material. In addition, by simply correcting for wobble, instead of eliminating sources for wobble, the scanner assembly can be fabricated from lower cost scanner assembly components that have not been manufactured from exotic materials using precision manufacturing techniques. This translates into substantial savings in costs to produce the scanner assembly of the present invention. In addition, since the scanner assembly corrects for wobble, wobble induced by wear of scanner assembly components over time is no longer a design concern.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principals of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures thereof, and wherein.

DETAILED DESCRIPTION OF THE PREFERRED EMBODIMENTS

Figure 1:
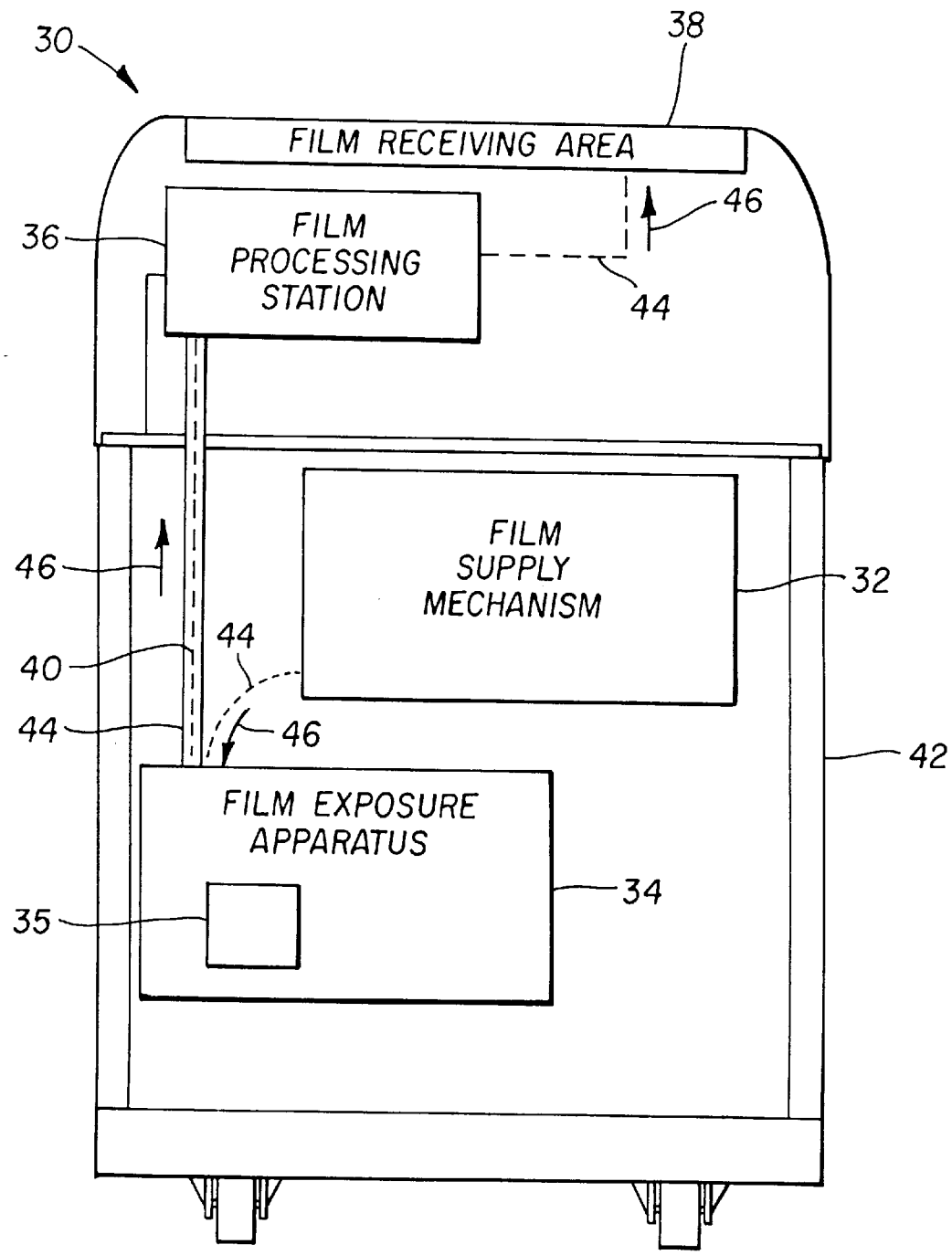
FIG. 1 is an elevational diagram illustrating a laser imaging system including a film exposure apparatus having a monogon optical scanner assembly in accordance with the present invention.

FIG. 1 generally illustrates an exemplary embodiment of a laser imaging system 30 suitable for use in the imaging industry, such as the medical imaging industry, including a film exposure apparatus 34 having a monogon optical scanner assembly 35 for correcting wobble in accordance with the present invention. The imaging system 30 includes a film supply mechanism 32, the film exposure apparatus 34, a film processing station 36, a film receiving area 38, and a film transport system 40. The film supply mechanism 32, the film exposure apparatus 34, the film processing station 36, and the film transport system 40 are all located within an imaging system housing 42.

Imaging material is stored within the film supply mechanism 32. The term "imaging material" includes any material in which an image can be captured, including medical imaging films, graphic art films, imaging materials used for data storage and the like. Examples of imaging materials include thermographic film, photothermographic film or photosensitive film. In one preferred embodiment the imaging material photosensitive film which is sensitive to laser beam light (i.e., a light sensitive film having a polymer or paper base coated with an emulsion of dry silver or other heat sensitive material). One known film suitable for use in medical imaging processes with a film exposure apparatus incorporating an optical scanner assembly in accordance with the present invention is commercially available under the trade name Dryview Imaging Film (DVB or DVC) manufactured by Imation Corp. of Oakdale, Minn.

The film transport system 40 allows the photosensitive film to be moved between the film exposure apparatus 34, the film processing station 36, and the film receiving area 38. The film transport system 40 may include a roller system (not shown) to aid in transporting the film along a film transport path, indicated by dashed line 44. The direction of film transport along film transport path 44 is indicated by arrows 46. In particular, the film supply mechanism 32 includes a mechanism for feeding a piece of film along film transport path 44 into the film exposure apparatus 34 for exposing the desired image on the photosensitive film using the optical scanner assembly 35 of the present invention. After exposure of the desired image on the photosensitive film, the photosensitive film is moved along the film transport path 44 to the film processing station 36. The film processing station 36 develops the image on the photosensitive film. After film development, the photosensitive film is transported to the film receiving area 38.

One film supply and pickup mechanism suitable for use in a laser imaging system in accordance with the present invention is as disclosed in U.S. patent application Ser. No. 08/939,510 (Nelson et al.), filed on Sep. 29, 1997, assigned to the same assignee as herein and incorporated herein by reference thereto. One suitable film processing station is as disclosed in U.S. patent application Ser. No. 08/940,091 (Allen), filed on Sep. 29, 1997, and U.S. patent application Ser. No. 08/239,709, filed May 9, 1994, both of which are assigned to the same assignee as herein and the entire contents of which are incorporated herein by reference thereto.

Figure 2:
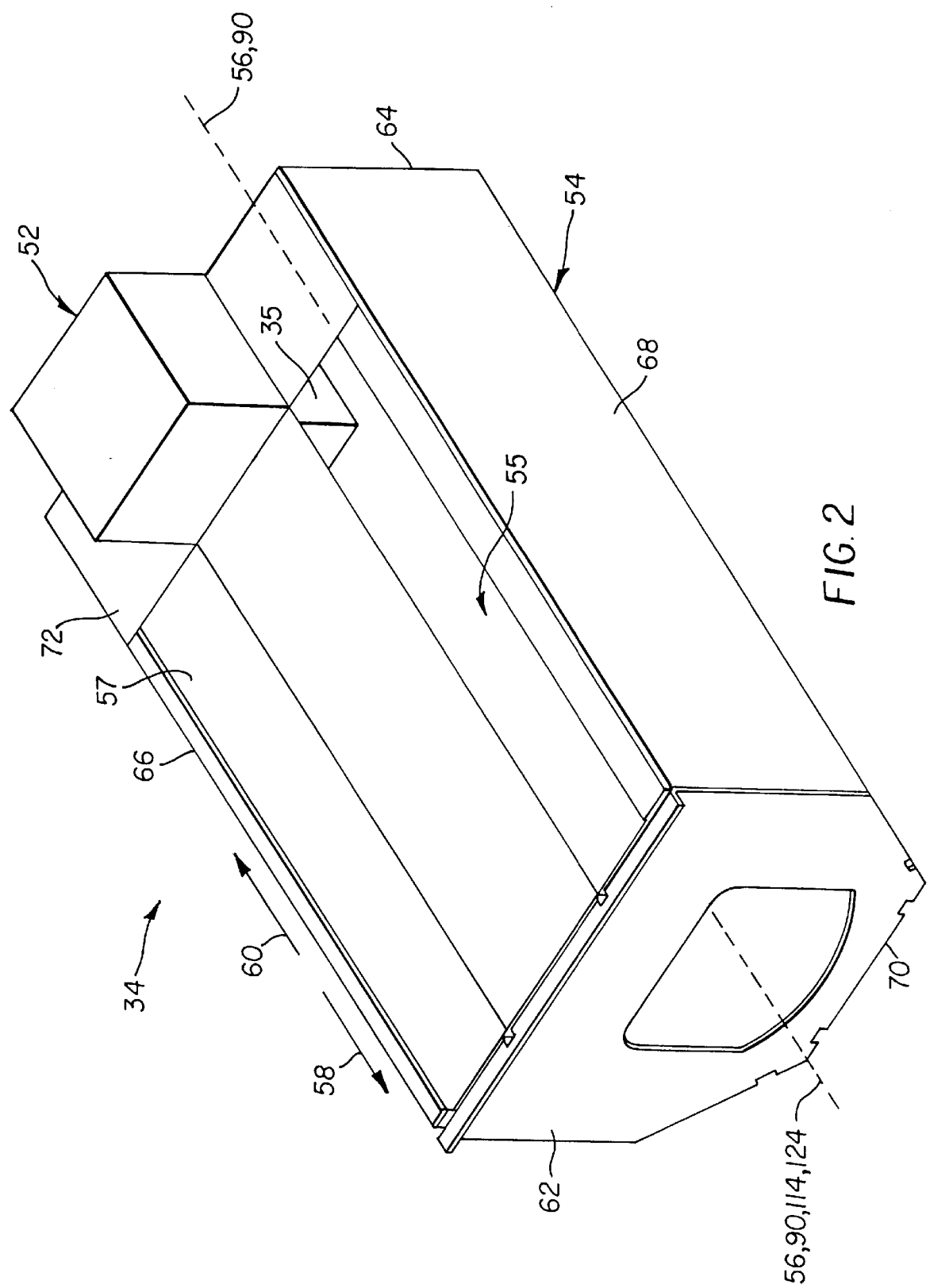
FIG. 2 is a perspective view illustrating particulars of the film exposure apparatus of FIG. 1 incorporating the optical scanner assembly in accordance with the present invention.
Figure 3:
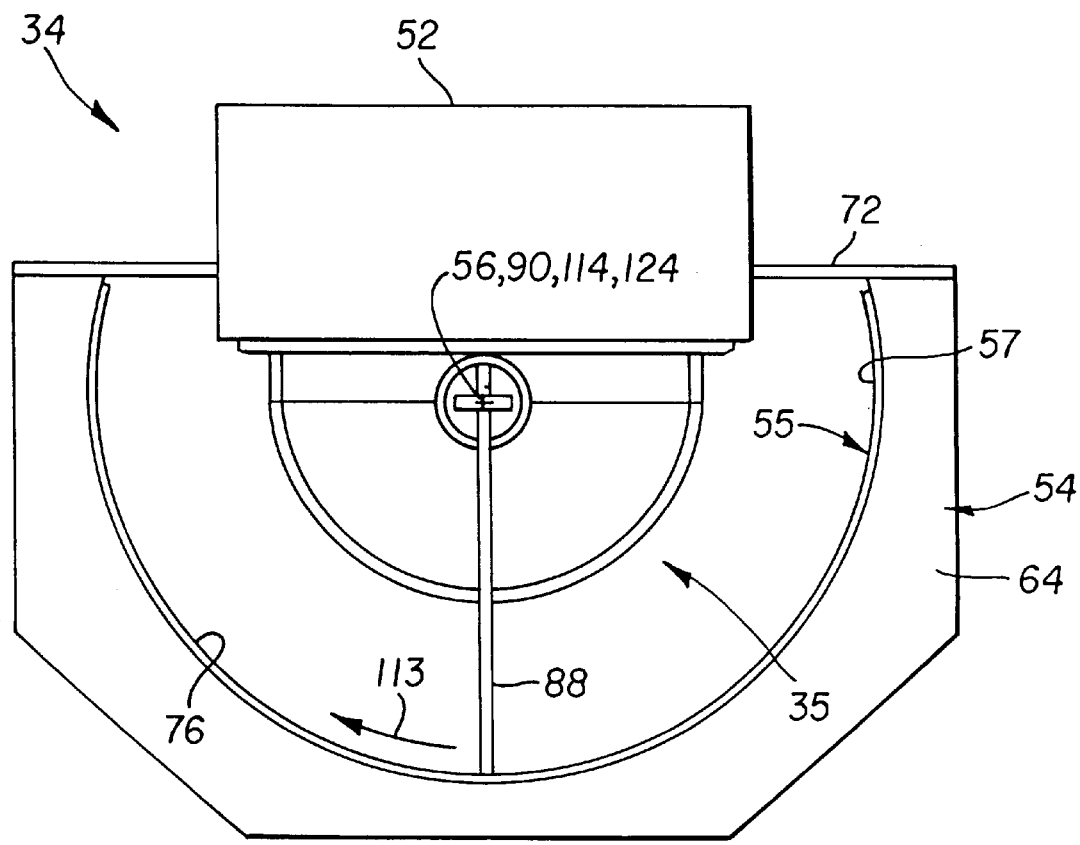
FIG. 3 is an end elevational view of the film exposure apparatus and the optical scanner assembly of FIG. 2.

As seen in FIGS. 2 and 3, the film exposure apparatus 34 has an internal-drum type configuration. The optical scanner assembly 35 of the film exposure apparatus 34 is mechanically coupled to a linear translation system 52. The linear translation system 52 is mounted to a drum frame 54 of the film exposure apparatus 34. The drum frame 54 includes a curved film platen 55, which can be defined as the internal drum surface. The center of curvature of the curved film platen 55, which is located along the drum longitudinal axis, is indicated by dashed line 56. The optical scanner assembly 35 is mechanically coupled to the linear translation system 52. During a scanning process, the linear translation system 52 operates to move the optical scanner assembly 35 along the longitudinal axis 56 (in a direction generally perpendicular to the scanning direction), indicated by directional arrow 58, and after scanning, returns the optical scanner assembly 35 to a start position, along the longitudinal axis 56, indicated by directional arrow 60.

One suitable linear translation system for use in a film exposure apparatus in accordance with the present invention is as disclosed in U.S. patent application Ser. No. 08/939,420 (Esch et al.), filed on Sep. 29, 1997, assigned to the same assignee as herein and incorporated herein by reference thereto.

As seen best in FIG. 2, the drum frame 54 includes a first end 62, a second end 64, a first side 66, a second side 68, a bottom 70, and a top 72. Film platen 55 is positioned within the drum frame 54. Film platen 55 provides a cylindrical or partially cylindrically-shaped internal scanning surface 57. The linear translation system 52 extends along the top 72 for positioning the optical scanner assembly 35 along the center of curvature (of a piece of film in scanning position on the film platen), indicated as the longitudinal axis 56. In particular, the linear translation system 52 is positioned between the first end 62 and the second end 64. In one preferred embodiment, the drum frame 54 is constructed of metal.

FIG. 3, illustrates a piece of photosensitive film 76 positioned on the curved film platen 55. During exposure (i.e., image production) of the photosensitive film 76, the photosensitive film 76 is held against the film platen 55 in a scanning position. In a scanning position, the photosensitive film 76 assumes the shape of the curved film platen 55, which has a cylindrical, partial cylindrical, or drum shape. The photosensitive film 76 is positioned in a scanning position (i.e., aligned and centered) using a film positioning mechanism (not shown).

One suitable film positioning mechanism for use in a laser imaging system in accordance with the present invention is disclosed in U.S. patent application Ser. No. 08/939,365 (Mattila et al.), filed on Sep. 29, 1997, assigned to the same assignee as herein and incorporated herein by reference thereto.

Figure 4:
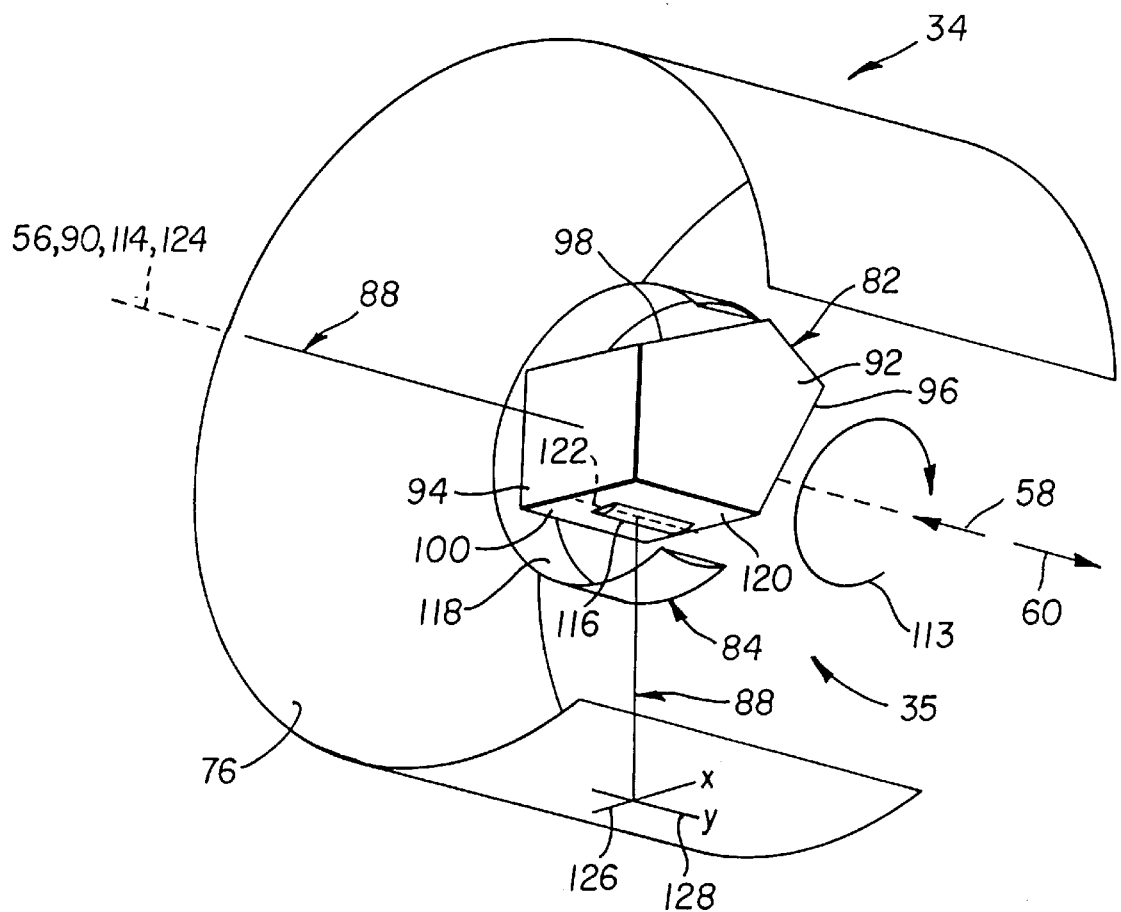
FIG. 4 is an enlarged perspective view illustrating a scan optic of the optical scanner assembly in accordance with the present invention.
Figure 5:
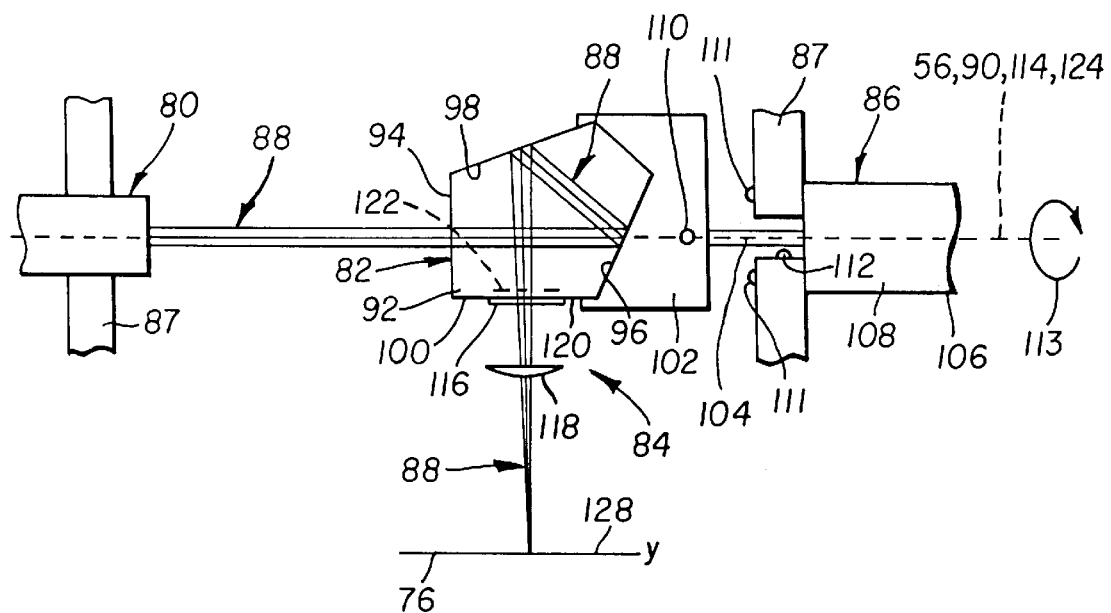
FIG. 5 is a side elevational view of the optical scanner assembly shown in FIG. 4 further illustrating a laser assembly, a scan optic drive mechanism, and the path of a laser beam through the scan optic in accordance with the present invention.
Figure 6:
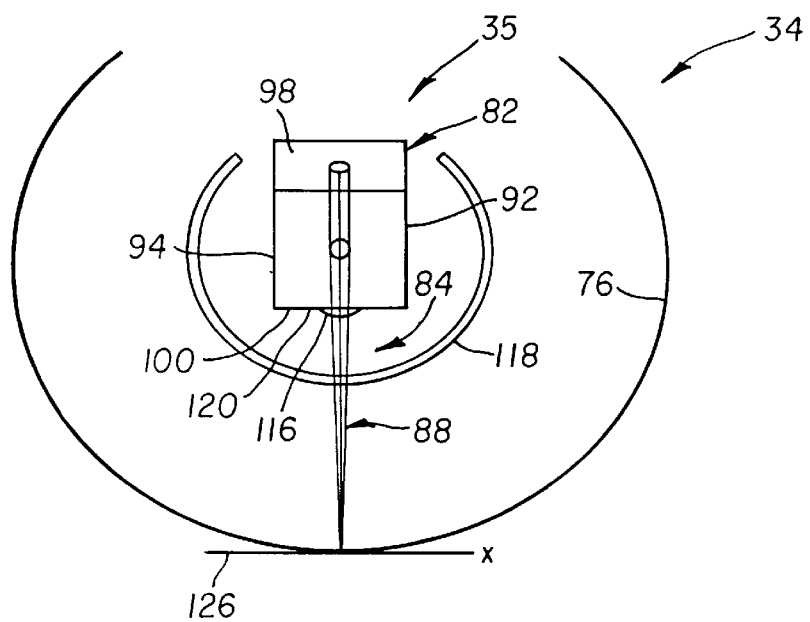
FIG. 6 is an end elevational view of the optical scanner assembly shown in FIG. 4 further illustrating the path of the laser beam.

As seen in FIGS. 4–6, the monogon optical scanner assembly 35 includes a light source, such as a laser assembly 80 (FIG. 5), a rotatable reflective system 82, a focusing system 84, and a drive mechanism 86 (FIG. 5). As seen best in FIG. 5, the laser assembly 80 is mounted to a scan assembly support bracket 87 that is in turn mounted to the linear translation system 52 of the film exposure apparatus 34. The laser assembly 80 can be mounted to scan assembly support bracket 87 in any known manner, such as set screws (not shown). The laser assembly 80 produces a laser light beam 88 that is representative of the image to be produced on the photosensitive film 76 held in the scanning position on the internal surface 57 of the curved film platen 55. The laser light beam 88 exits the laser assembly 80 along a beam axis 90 that substantially coincides with the drum longitudinal axis 56. The rotatable reflective system 82 includes a multifaceted scan optic, such as a pentaprism 92. Alternatively rotatable reflective system 82 may comprise an assembly of reflective surfaces. The pentaprism 92 has a transparent incident surface 94 facing the laser assembly 80, a first internal reflective surface 96, a second internal reflective surface 98, and a transparent exiting surface (i.e., output surface) 100. The exiting surface 100 of the pentaprism 92 is perpendicular to the incident surface 94 and faces the photosensitive film 76 on the internal surface 57 of the curved film platen 55. In one preferred embodiment, the pentaprism 92 is made of glass and the first and second internal reflective surfaces 96 and 98 are made reflective by metallic coating (e.g., aluminum or silver coating).

As seen best in FIG. 5, the pentaprism 92 is secured to one end of a prism mount 102 via an adhesive, such as epoxy. An opposite end of the prism mount 102 is mounted to a drive shaft 104 that protrudes from a casing 106 of an electric drive motor 108. The prism mount 102 can be secured to the drive shaft 104 in any known manner, such as a set screw 110. The drive motor 108 is mounted to scan assembly support bracket 87 in any known manner, such as screw fasteners 111. The drive shaft 104 of the drive motor 108 passes freely through an opening 112 in the scan assembly support bracket 87. The drive motor 108, upon application of power, drives the drive shaft 104 so as to rotate the pentaprism, as represented by arrow 113 in FIG. 4, about a rotation axis 114 substantially coincident with the beam axis 90 and the drum longitudinal axis 56.

As seen best in FIG. 5, the laser light beam 88 produced by the laser assembly 80 travels first along a beam path coincident with the beam axis 90, and enters the pentaprism 92 by passing through the transparent incident surface 94 which is proximal to the first internal reflective surface 96. The first internal reflective surface 96 receives the laser light beam 88 from the laser assembly 80 (once the laser light beam 88 passes through the incident surface 94), and reflects the laser light beam 88, along a beam path, to the second internal reflective surface 98. The second internal reflective surface 98 receives the laser light beam 88 reflected from the first internal reflective surface 96, and further reflects the light beam 88, along a beam path, to the photosensitive film 76 on the internal surface 57 of the curved film platen 55. The laser light beam 88 reflected by the second internal reflective surface 98 exits the pentaprism 92 by passing through the transparent exiting surface 100 which is distal to the second reflective surface 98. Upon exiting the exiting surface 100 of the pentaprism 92, the laser light beam 88 (which has been reflected from the second reflective surface 98) passes through the focusing system 84. The focusing system 84 focuses the light beam 88 onto the photosensitive film 76 to produce an image thereon.

As seen in FIGS. 4–6, the focusing system 84 includes a first lens device, defined by a cylindrical lens 116, and a second lens device, defined by a toric lens 118. The cylindrical lens 116 is on an exterior portion 120 of the exiting surface 100 of the pentaprism 92, and as such the cylindrical lens 116 is rotatable with the pentaprism 92 about the rotation axis 114. The cylindrical lens 116 has a center of curvature axis 122 (FIG. 5) that is substantially parallel to the longitudinal, beam and rotation axes 56, 90 and 114, respectively.

The position of cylindrical lens 116 is fixed relative to pentaprism 92. In one preferred embodiment, the lens 116 is a plano-convex cylinder lens which is positioned at surface 100 (i.e., formed integral with or affixed to surface 100). In one embodiment, the cylindrical lens 116 is glass and is formed integral with (so as to be a part of) the exterior portion 120 of the exiting surface 100 of the glass pentaprism 92. Alternatively, the cylindrical lens 116 can be a separately formed glass element that can be secured to the exterior portion 120 of the exiting surface 100 of the glass pentaprism 92 via an adhesive or adhesive mechanism, such as epoxy. As a further alternative, the cylindrical lens 116 can be of a polymeric or plastic material cast onto the exterior portion 120 of the exiting surface 100 of the glass pentaprism 92. In another embodiment, cylindrical lens 116 is spaced from pentaprism 92 along the optical path defined by beam 88, in a fixed position relative to the pentraprism 92.

The toric lens 118 of the focusing system 84 is mounted to the scan assembly support bracket 87 (e.g., through the use of a guide mechanism) so as to be stationary with respect to the rotatable pentaprism 92 and the cylindrical lens 116. The toric lens 118 is mounted to the scan assembly support bracket 87 via any known manner, such as a guide mechanism or screw fasteners. The toric lens 118 has a center of curvature axis 124 that is substantially coincident with the longitudinal, beam and rotation axes 56, 90 and 114.

In one preferred embodiment, toric lens 118 is a relatively thin, flexible, long (several inches) cylinder lens having a plano-convex shape. The lens 118 is capable of being easily "flexed" or "bent" in over a 180° arch (e.g., to match the geometrical shape of the film platten as shown), while exhibiting and maintaining diffraction limited optical characteristics. As well known to those skilled in the art, by maintaining diffraction limited optical characteristics, when the flexible lens 118 is used to focus a laser beam on a scanned surface, a predictable focus spot size (and position) is achieved across the scanned surface which can be calculated based on the physical characteristics of the lens. As used herein, the term "diffraction limited" can be defined as the property of an optical system, whereby only the effects of diffraction determine the quality of the image it produces. The term "diffraction limited lens" can be defined as a lens with aberrations corrected to the point that residual wavefront errors are substantially less than ¼ the wave length of the energy of being acted upon. See, the *Photonics Dictionary*, 41$^{st}$ *Edition*, 1995 (Laurin Publishing, 1995).

In one preferred embodiment, lens 118 includes a long, thin, flexible structural layer constructed of a polymeric material, the structural layer being a longitudinally extending member having a first major surface and a second major surface, wherein the first major surface and the second major surface are generally flat. A first optical layer extends along the first major surface, wherein the first optical layer is shaped to exhibit a desired optical characteristic (e.g., a convex shape). In one aspect, the first optical layer is made of a photopolymer. The flexible lens exhibits diffraction limited optical characteristics. The flexible lens is several inches in length and capable of flexing into a desired shape, such as being wrapped about a cylindrically shaped guide. The flexible lens is capable of being flexed into a semi-circular shape and when the flexible lens is flexed into a semi-circular shape it maintains its diffraction limited optical characteristics. The lens 118 may further include a second optical layer extending along the second major surface, wherein the second optical layer is flat. In one embodiment, the second optical layer is made of a photopolymer.

In one preferred embodiment, a long, thin, flexible cylinder lens having a plano-convex optical shape suitable for use as toric lens 118 is disclosed in U.S. patent application Ser. No. 08/939,842 (Schubert, Paul C.) filed on Sep. 29, 1997. U.S. patent application Ser. No. 08/939,842 is incorporated herein by reference.

As seen best in FIGS. 5 and 6, the cylindrical lens 116 receives the laser light beam 88, reflected from the second internal reflective surface 98 through the exiting surface 100, and focuses (i.e., converges) the light beam 88 along an X-axis 126 (see FIG. 6). The X-axis 126 extends substantially perpendicular to the drum longitudinal axis 56. The cylindrical lens 116 does not alter the light beam 88 along a Y-axis 128 (see FIG. 5). The Y-axis 128 extends substantially parallel to the drum longitudinal axis 56 and is perpendicular to the X-axis 126. The toric lens 118 receives the laser light beam 88 focused by the cylindrical lens 116, and further focuses (i.e., converges) the light beam 88 to produce an image on the photosensitive film 76 on the internal surface 57 of the curved film platen 55. The toric lens 118 focuses the light beam 88 only in the Y-axis 128 (see FIG. 6). The toric lens 118 does not alter the light beam 88 (previously focused by the cylindrical lens 116) in the X-axis 126.

In operation, with the photosensitive film 76 in a scanning position aligned, centered and held against the internal surface 57 of the film platen 55, the optical scanner assembly 35 scans the laser light beam 88 representative of an image to be exposed on the film 76, across the film scanning surface in an image-wise pattern. In particular, the scanning laser beam 88 emanates radially from the center of curvature 56 of the film platen 55 (and film 76), which is located along the center of curvature of the drum longitudinal axis 56. The optical scanner assembly 35 scans the laser light beam 88 containing image data representative of the image to be exposed in raster lines by rotating about the rotational axis 114 as indicated by the directional arrow 113. As the optical scanner assembly 35 scans the image and raster lines in an image-wise pattern across the photosensitive film 76 located on the internal surface 57 of the curved film platen 55, the linear translation system 52 moves the optical scanner assembly 35 along the center of curvature longitudinal axis 56 to expose a full image on the photosensitive film 76. The linear translation system 52 moves the optical scanner assembly 35 along the longitudinal axis 56 in a direction which is generally perpendicular to the scanning direction of laser beam 88. Since the linear translation system 52 moves the optical scanner assembly 35 during each scan line, the resulting scan lines are substantially perpendicular to the direction of movement of the linear translation system 52.

In prior scanner assemblies, bearing, drive shaft and other drive motor mechanical inaccuracies cause "wobble" along the rotational axis of the scan optic. This wobble causes the laser light beam that is directed toward the photosensitive film by the scan optic to be not perpendicular to the laser light beam exiting the laser assembly. In other words, wobble causes the laser light beam exiting the scan optic of prior scanner assemblies to be directed at a divergent angle. This situation results in image defects in the image produced on the photosensitive film. In the monogon optical scanner assembly 35 of the present invention, the laser light beam 88 exiting the exiting surface 100 of the pentaprism 92 is always substantially perpendicular to the laser light beam 88 exiting the laser assembly 80 despite any wobble inducing mechanical inaccuracies in the drive mechanism 86. Since the angle of incidence equals the angle of reflectance for both the first and second internal reflective surfaces 96 and 98, wobble only causes the laser light beam 88 exiting the exiting surface 100 of the pentaprism 92 to be displaced slightly along the longitudinal axis 56 to a plane that remains parallel to an optimum (i.e., non-wobble) plane of an exiting laser light beam. Any slight displacement is compensated for with lens 118. In other words, in the scanner assembly 35 of the present invention, the laser light beam 88 never exits the pentaprism 92 at a divergent angle. The cylindrical and toric lenses 116 and 118 then focus the laser light beam 88 onto the photosensitive film 76 without any discernable wobble effect (i.e., without wobble induced image defects).

In summary, by using the cylindrical and toric lenses 116 and 118 in conjunction with the pentaprism 92, and by placing the cylindrical lens 116 along the optical path after beam 88 exits pentaprism 92 (e.g., on the exiting surface 100 of the pentaprism 92), along with toric lens 118, this scanner assembly corrects for wobble along the rotation axis 114 of the pentaprism 92 caused by bearing and mechanical inaccuracies in the drive mechanism 86. By correcting for wobble, the scanner assembly 35 substantially eliminates image defects in the image produced on the photosensitive film 76. In addition, by simply correcting for wobble, instead of eliminating sources for wobble, the scanner assembly 35 can be fabricated from lower cost scanner assembly components (e.g., a less costly drive mechanism 86) that have not been manufactured from exotic materials using precision manufacturing techniques. This translates into substantial savings in costs to produce the scanner assembly 35 of the present invention. In addition, since the scanner assembly 35 corrects for wobble, wobble induced by wear of scanner assembly components over time is no longer a design concern.

Although the present invention has been described with reference to preferred embodiments, workers skilled in the art will recognize that changes may be made in form and detail without departing from the spirit and scope of the invention.

What is claimed is:

1. An optical scanner assembly for producing an image on imaging material positioned on an internal surface of a curved film platen, the scanner assembly comprising:
   a light source for producing a light beam representative of the image to be produced on the imaging material, the light beam exiting the light source along a beam axis; and
   a reflective system rotatable about a rotation axis substantially coincident with the beam axis, the reflective system including:
   a scan optic, the scan optic including:
   a first reflective surface for receiving the light beam from the light source and reflecting the light beam; and
   a second reflective surface for receiving the light beam reflected from the first reflective surface and reflecting the light beam toward the imaging material on the internal surface of the curved film platen;
   a lens device for focusing the light beam onto the imaging material to produce the image thereon; and
   a further lens device that is stationary with respect to the rotatable reflective system, the further lens device receiving the light beam focused by the lens device, the further lens device further focusing the light beam onto the imaging material to produce the image thereon.

2. The optical scanner assembly of claim 1 wherein the scan optic is a prism.

3. The optical scanner assembly of claim 2 wherein the prism is a pentaprism.

4. The optical scanner assembly of claim 3 wherein the pentaprism includes:
   first and second internal reflective surfaces that constitute the first and second reflective surfaces, respectively;
   an incident surface for receiving the light beam from the light source, the incident surface being distal to the first internal reflective surface; and
   an exiting surface distal to the second internal reflective surface for receiving the light beam reflected from the second internal reflective surface.

5. The optical scanner assembly of claim 4 wherein the incident surface faces the light source, and wherein the incident surface is transparent such that the light beam enters the pentaprism by passing through the incident surface.

6. The optical scanner assembly of claim 4 wherein the exiting surface faces the imaging material positioned on the internal surface of the curved film platen, and wherein the exiting surface is transparent such that the first and second internal reflective surfaces cooperatively direct the light beam through the exiting surface.

7. The optical scanner assembly of claim 4 wherein the lens device is on an exterior portion of the exiting surface of the pentaprism.

8. The optical scanner assembly of claim 7 wherein the lens device is a cylindrical lens.

9. The optical scanner assembly of claim 8 wherein the cylindrical lens has a center of curvature axis, and wherein the center of curvature axis is substantially parallel to the beam and rotation axes.

10. The optical scanner assembly of claim 9 wherein the cylindrical lens is integral with the exterior portion of the exiting surface of the pentaprism.

11. The optical scanner assembly of claim 9 wherein the cylindrical lens is a separate cylindrical lens that is secured to the exterior portion of the exiting surface of the pentaprism.

12. The optical scanner assembly of claim 9 wherein the cylindrical lens is a plastic material cast onto the exterior portion of the exiting surface of the pentaprism.

13. The optical scanner assembly of claim 1 wherein the lens device is a cylindrical lens.

14. The optical scanner assembly of claim 13 wherein the cylindrical lens has a center of curvature axis, and wherein the center of curvature axis is substantially parallel to the beam and rotation axes.

15. The optical scanner assembly of claim 14 wherein the scan optic further includes:
   a transparent output surface distal to the second reflective surface such that the light beam passes through the transparent output surface, the cylindrical lens being on an exterior portion of the output surface of the scan optic.

16. The optical scanner assembly of claim 15 wherein the cylindrical lens is integral with the exterior portion of the output surface of the scan optic.

17. The optical scanner assembly of claim 15 wherein the cylindrical lens is a separate cylindrical lens that is secured to the exterior portion of the output surface of the scan optic.

18. The optical scanner assembly of claim 15 wherein the cylindrical lens is a plastic material cast onto the exterior portion of the output surface of the scan optic.

19. The optical scanner assembly of claim 1 wherein the light source is a laser assembly, and wherein the light beam is a laser beam.

20. The optical scanner assembly of claim 1 wherein the lens device focuses the light beam in a first plane, and wherein the further lens device focuses the light beam in a second plane perpendicular to the first plane.

21. The optical scanner assembly of claim 20 wherein the lens device is a cylindrical lens, and wherein the further lens device is a toric lens.

22. An optical scanner assembly for producing an image on imaging material positioned on an internal surface of a curved film platen, the scanner assembly comprising:

a light source for producing a light beam representative of the image to be produced on the imaging material, the light beam exiting the light source along a beam axis;

a scan optic rotatable about a rotation axis substantially coincident with the beam axis, the scan optic including:

first reflective surface for receiving the light beam from the light source and reflecting the light beam; and a second reflective surface for receiving the light beam reflected from the first reflective surface and reflecting the light beam toward the imaging material on the internal surface of the curved film platen;

a drive mechanism for rotating the scan optic about the rotation axis; and a system for focusing the light beam onto the imaging material to produce the image thereon, the focusing system including:

a first tens device and focusing the light beam on said imaging material; and a second lens device for receiving the light beam focused by the first lens device, the second lens device further focusing the light beam to produce the image on the imaging material on the internal surface of the curved film platen.

23. The optical scanner assembly of claim 22 wherein the first lens device focuses the light beam in a first plane, and wherein the second lens device focuses the light beam in a second plane perpendicular to the first plane.

24. The optical scanner assembly of claim 23 wherein the first lens device is a cylindrical lens, and wherein the second lens device is a toric lens.

25. The optical scanner assembly of claim 22 wherein the first lens device is part of the scan optic so as to be rotatable therewith.

26. The optical scanner assembly of claim 25 wherein the second lens device is stationary with respect to the first lens device that is rotatable with the scan optic.

27. A method of producing an image on imaging material positioned on an internal surface of a curved film platen using an optical scanner assembly, the method comprising the steps of:

directing a light beam representative of the image to be produced on the imaging material along a beam axis;

reflecting the light beam using a first reflective surface;

further reflecting the light beam, reflected from the first reflective surface, using a second reflective surface;

focusing, in only a first plane, the light beam reflected from the second reflective surface using a first lens device; and further focusing, in only a second plane that is perpendicular to the first plane, the light beam reflected from the second reflective surface using a second lens device, to produce the image on the imaging material on the internal surface of the curved film platen.

28. The method of claim 27 wherein the steps of reflecting, further reflecting and focusing include the step of:

rotating in unison the first reflective surface, the second reflective surface and the first lens device.

* * * * *